US008208375B2

(12) United States Patent
Bharadwaj et al.

(10) Patent No.: US 8,208,375 B2
(45) Date of Patent: Jun. 26, 2012

(54) SELECTIVE FILTERING OF NETWORK TRAFFIC REQUESTS

(75) Inventors: Manjunath Bharadwaj, Bellevue, WA (US); Nathan Howell, Seattle, WA (US); Wei Jiang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/050,162

(22) Filed: Mar. 17, 2008

(65) Prior Publication Data

US 2009/0231998 A1    Sep. 17, 2009

(51) Int. Cl.
*G06F 11/00* (2006.01)
(52) U.S. Cl. .................................... 370/230; 370/395.3
(58) Field of Classification Search ................. 370/230; 726/11, 13, 7
See application file for complete search history.

(56) References Cited

U.S. PATENT DOCUMENTS

| | | | |
|---|---|---|---|
| 5,996,011 A | 11/1999 | Humes | |
| 6,233,618 B1 | 5/2001 | Shannon | |
| 6,256,739 B1 | 7/2001 | Skopp et al. | |
| 6,505,300 B2 | 1/2003 | Chan et al. | |
| 6,615,266 B1 | 9/2003 | Hoffman, Jr. et al. | |
| 6,701,350 B1 | 3/2004 | Mitchell | |
| 7,587,499 B1 * | 9/2009 | Haghpassand | 709/229 |
| 2003/0212887 A1 | 11/2003 | Walther et al. | |
| 2004/0003290 A1 * | 1/2004 | Malcolm | 713/201 |
| 2004/0010710 A1 | 1/2004 | Hsu et al. | |
| 2006/0021004 A1 * | 1/2006 | Moran et al. | 726/2 |
| 2006/0277250 A1 | 12/2006 | Cherry et al. | |
| 2006/0288213 A1 | 12/2006 | Gasparini et al. | |
| 2007/0240208 A1 | 10/2007 | Yu et al. | |
| 2008/0235623 A1 * | 9/2008 | Li | 715/817 |
| 2008/0311893 A1 * | 12/2008 | Liu et al. | 455/414.2 |
| 2009/0193253 A1 * | 7/2009 | Falk et al. | 713/171 |

FOREIGN PATENT DOCUMENTS

WO    0198934 A2    12/2001

OTHER PUBLICATIONS

Turner, et al., "Symantec Internet Security Threat Report", Trends for Jul. 5-Dec. 5, vol. IX, Published Mar. 2006, pp. 1-120.
"International Search Report", Filed Date Feb. 12, 2009, Application No. PCT/US2009/033877, pp. 1-11.

* cited by examiner

*Primary Examiner* — Huy D Vu
*Assistant Examiner* — Omer Mian

(57) ABSTRACT

Several approaches to selectively filtering network traffic are described. One approach involves a system for selectively filtering network traffic. The system includes a helper application, which is coupled to a networking program, and is used to identify a user-initiated request. A network filter driver is coupled to the networking program, for intercepting the user-initiated request. A filtering service is coupled to both the helper application and the network filter driver, and is used to determine if the user-initiated request is allowable. If the request is allowable, the filtering service is configured to generate a special identifier, which the helper application is configured to include in a subsequent request. The filtering service is configured to allow a subsequent request which includes the special identifier, and the network filter driver's configured to strip a special identifier from subsequent requests.

20 Claims, 5 Drawing Sheets

Flowchart 500

Computer System 301

Flowchart 500

SELECTIVE FILTERING OF NETWORK TRAFFIC REQUESTS

BACKGROUND

Selective screening or filtering of traffic is a useful tool in a computer network environment. When properly configured, for example, filtering traffic can prevent access to inappropriate content, focus the scope of content accessible by a public or work computer, or reduce the risk of exposure to a computer virus or online fraud scheme.

Broadly speaking, network traffic filtering approaches generally operate by intercepting requests from an application, such as Web browser. These requests are then vetted with reference to a filtering policy, often with further reference to a centralized authentication service. If the request is allowable under the local policy, the application is allowed to proceed with the network request; if the request is not allowed, the application may be redirected to an informative message, indicating that the requested content cannot be accessed under the current policy.

Often, existing traffic filtering approaches will include a logging functionality, which records the requests issued by the applications being monitored. These logs can then be examined to determine what requests have been made, as well as what content has been accessed.

SUMMARY

Several approaches to selectively filtering network traffic are described. One approach involves determining if an initial request is allowable. A special identifier corresponding to the initial request is generated, and included in a subsequent request.

Another approach involves a system for selectively filtering network traffic. The system includes a helper application, which is coupled to a networking program, and is used to identify a user-initiated request. A network filter driver is coupled to the networking program, for intercepting the user-initiated request. A filtering service is coupled to both the helper application and the network filter driver, and is used to determine if the user-initiated request is allowable. If the request is allowable, the filtering service is configured to generate a special identifier, which the helper application is configured to include in a subsequent request. The filtering service is configured to allow a subsequent request which includes the special identifier, and the network filter driver's configured to strip a special identifier from subsequent requests.

A further approach involves intercepting a user-initiated request for network-accessible content. The user-initiated request is checked against a filtering policy. An identifier corresponding to the user-initiated request is generated, and included in a subsequent request. The subsequent request is intercepted, and the included identifier is checked for validity. A subsequent request is allowed, without reference to the filtering policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

Figure 1:
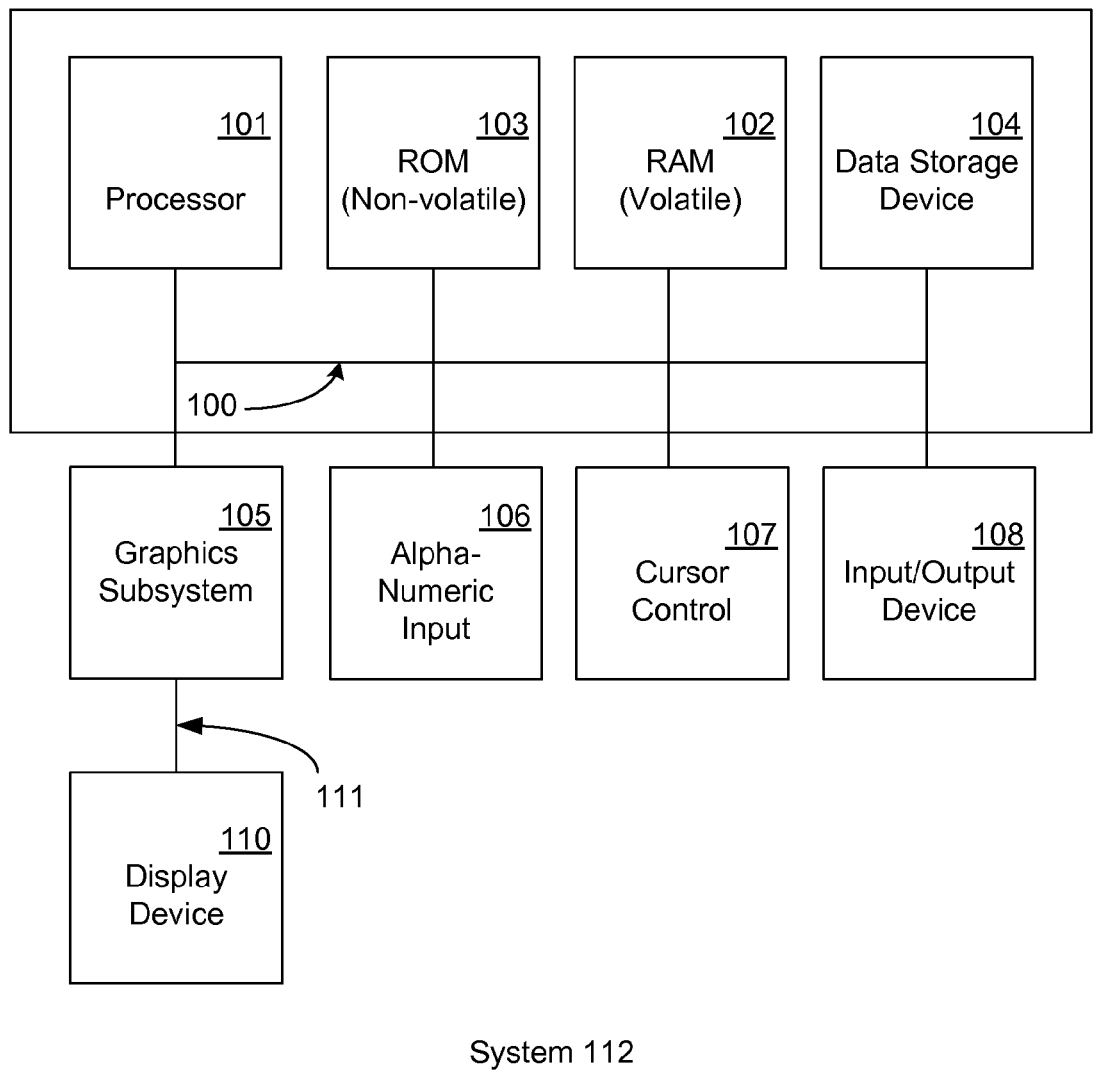
FIG. 1 depicts a block diagram of an exemplary computer system, upon which embodiments may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computer system 112, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Selective Filtering of Network Traffic Requests

In the following embodiments, an approach is described for selective filtering of network traffic requests. In several of these embodiments, only user-initiated requests need to be filtered. Other requests, such as the automatic requests generated by a Web browser when loading a page, can bypass the filtering process.

In one embodiment, a helper application is installed on a computer, which interfaces with a monitored networking program, such as a Web browser. The helper application distinguishes between user-initiated requests, such as typing in a URL or clicking on a hyperlink, and automated or automatic requests, such as the Web browser attempting to load various images on a web page.

In this embodiment, a network filter driver is also installed, residing between the monitored networking program and the networking stack for the computer's operating system. The network filter driver interfaces with a filtering service, also residing on the computer, in order to determine whether or not to allow a network request to proceed to the networking stack. The filtering service compares user-initiated requests with the local filtering policy, to determine if the user-initiated request is allowable. This comparison often involves accessing a remote filtering server, which maintains a database or listing of ratings corresponding to various network-available content, such as web pages. If the user-initiated request is allowable, the filtering service passes a special networking header to the helper application.

The helper application can then include this special networking header on automated requests related to the allowable user-initiated request. For these automated requests, the presence of the special networking header indicates to the filtering service that the request can be allowed without authentication or logging; the special networking header is stripped by the network filter driver, and the automated request is allowed to access the networking stack.

This embodiment results in a filtering service that produces a more readable log file, in that automated requests generated by accessing allowable content are not included in the log of user-initiated requests. Moreover, this embodiment results in fewer accesses to the remote filtering server, as automated requests related to an already-cleared user-initiated request do not have to be authenticated separately.

Basic Computing System

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like. Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Exemplary Networking Environment

Figure 2:
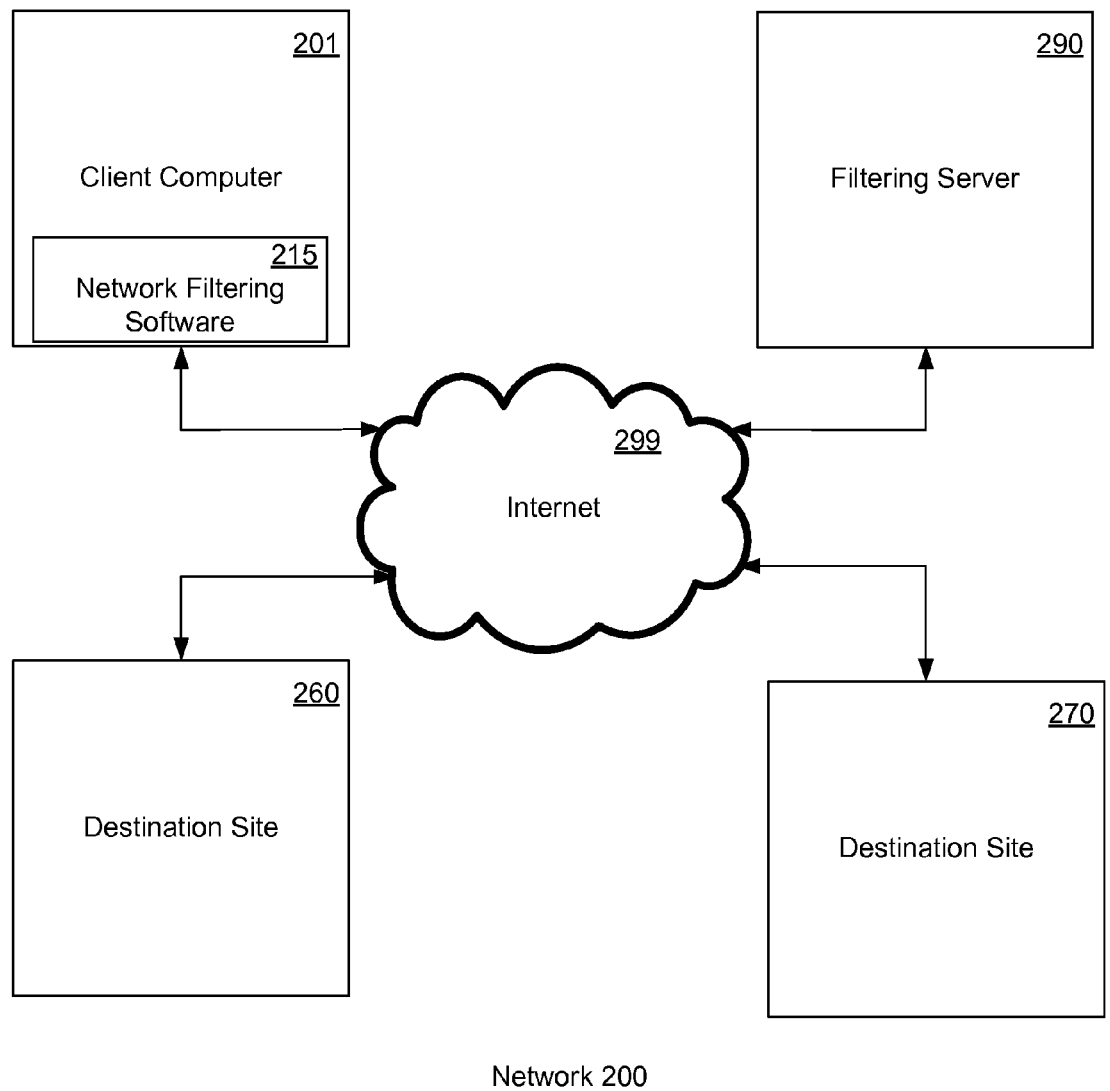
FIG. 2 depicts a block diagram of an exemplary network, in accordance with one embodiment.

With reference now FIG. 2, an exemplary network 200 is depicted, in accordance with one embodiment. While network 200 is shown as incorporating specific, enumerated elements and features, it is understood that embodiments are well suited to applications involving additional, fewer, or different features, elements, or arrangements.

In the depicted embodiment, a client computer 201 can access a number of destination sites 260 and 270 by means of Internet 299. Client computer 201, in the depicted embodiment, includes network filtering software 215. Before client computer 201 is allowed to request content from a particular destination site, network filtering software 215 determines whether to allow or deny the request. In some embodiments, network filtering software 215 accesses filtering server 290, by means of Internet 299, in order to determine whether to allow or prevent the request from proceeding.

Often, a single user-initiated request for access to some content will result in many requests being issued by a network application. For example, if a user enters a URL into a Web browser for a web site containing multiple images drawn from different locations, the single user-initiated request results in the Web browser issuing separate requests for each image included on the requested web site. The Web browser may also issue requests for other content, e.g., advertising banners or images which are included on the requested web site.

For example, a user of client computer 201 may request a web site hosted by destination site 260. The requested web site includes images which are hosted by destination site 270. Client computer 201 will issue separate requests for each image included in the requested web site.

Hardware Abstraction Layers

Figure 3:
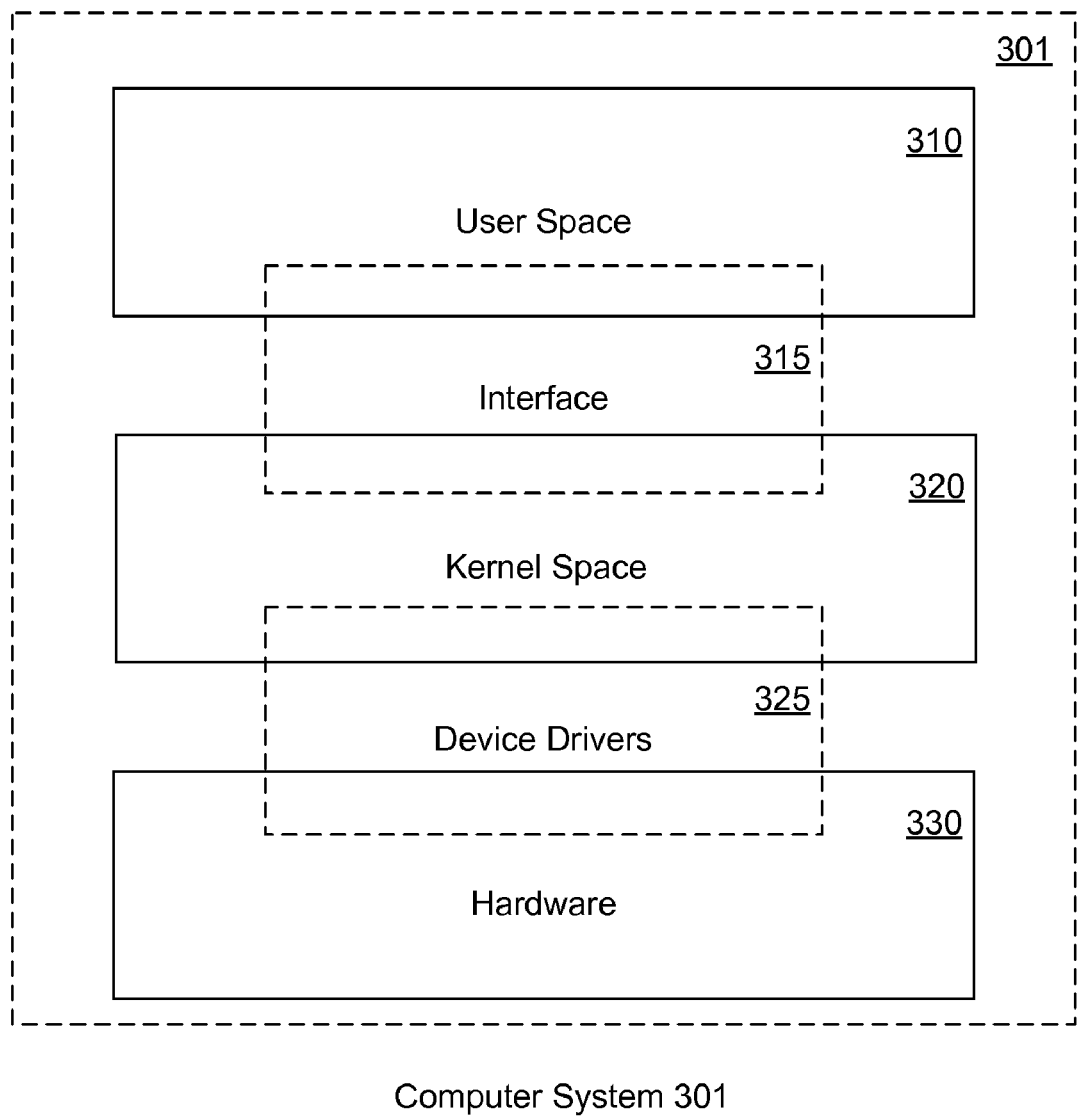
FIG. 3 depicts a representation of the programmatic layers of a computer system, in accordance with one embodiment.

With reference now to FIG. 3, a representation of the programmatic layers of a computer system 301 is presented, in accordance with one embodiment. While FIG. 3 depicts certain, specific enumerated features and elements, it is understood that embodiments are well suited to applications with additional, fewer, or different features and elements.

As depicted in FIG. 3, computer system 301 can be envisioned as being made up of layers of increasing abstraction.

The bottommost layer, shown here as hardware layer 330, consists of the actual electronic components that make up the computer system, e.g., a processor, system memory, or a network interface card (NIC).

Moving one layer up from hardware layer 330, FIG. 3 shows kernel space 320. Interaction between kernel space 320 and hardware layer 330, in some embodiments, is achieved by the operation of one or more specific pieces of software, e.g., device drivers, shown here as device drivers 325. In some situations, a device driver may be specific to a particular manufacturer or even model of a hardware component. One of the functions of the kernel, and of the interface to the kernel, is to allow interaction between the highest abstraction levels with the hardware that makes up the computer system.

The uppermost layer, shown here as user space 310, interacts with kernel space 320 by means of an interface 315. Interface 315 exposes the functions and services available through the kernel to applications running in user space 310. An application executing in user space 310 can invoke "callback handlers" (or "handlers") in the kernel, to request services or to request that functions be performed on its behalf.

Filtering Software Components

In different embodiments, network filtering may be applied to different applications. For example, network filtering may be utilized in conjunction with Web browsing (HTTP traffic), instant messaging, games, online media purchasing and/or playback, or peer-to-peer traffic applications. In some embodiments, such as the embodiment described below with reference to FIG. 4, a network filtering "helper" application interfaces with an existing networking program, e.g., a Web browser, by means of programmatic hooks or interfaces available through the networking program. It is understood that, in other embodiments, some or all of the functionality ascribed to the various filtering software components described below can be incorporated into additional, fewer, or different programs, components, or interfaces.

Figure 4:
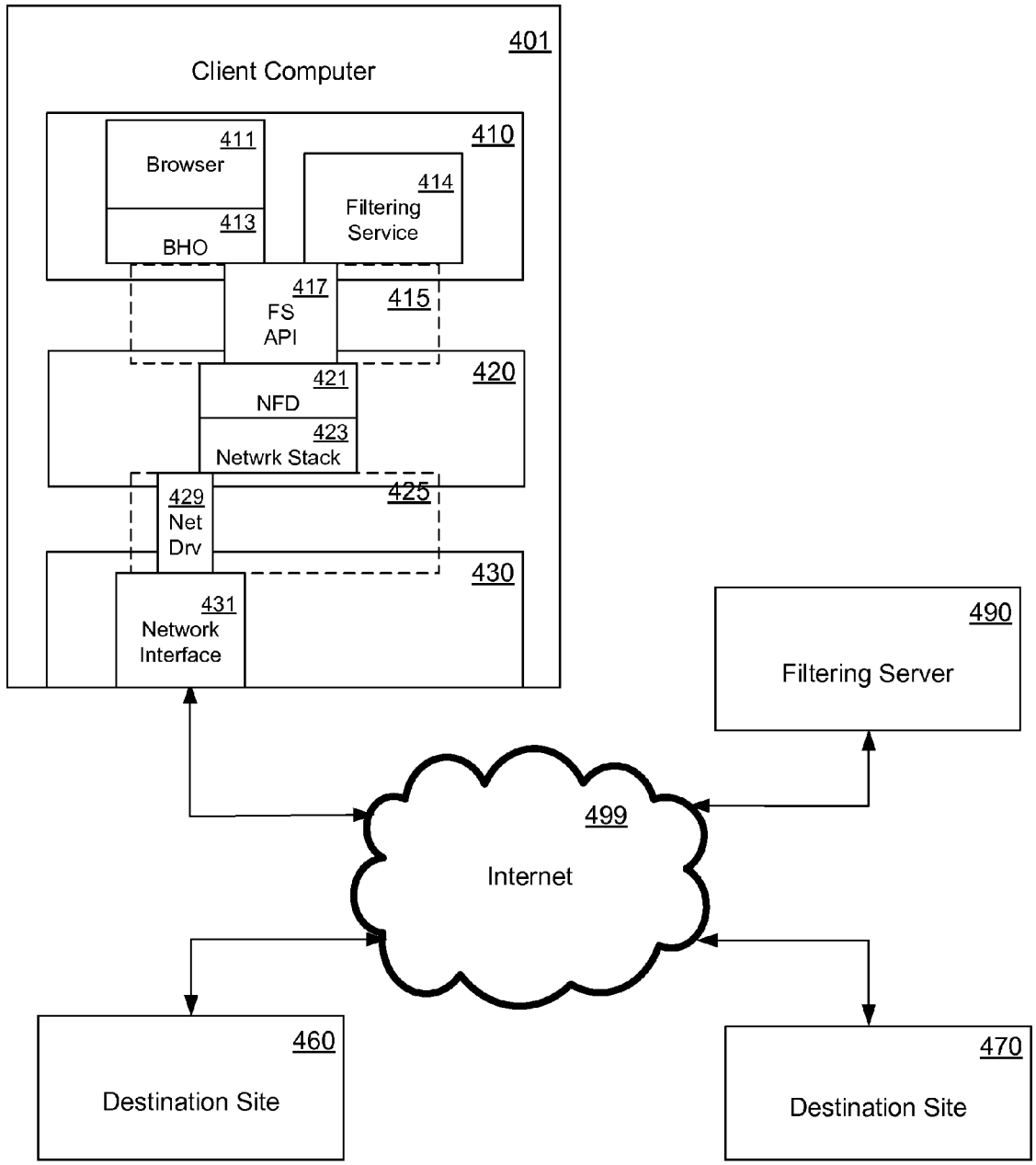
FIG. 4 depicts a block diagram of an exemplary computer system and network, in accordance with one embodiment.

With reference now to FIG. 4, a block diagram of an exemplary network 400 is depicted, in accordance with one embodiment. While network 400 is shown as incorporating specific, enumerated features and elements, it is understood that embodiments are well suited to applications involving additional, fewer, or different features, elements, or arrangements.

In the depicted embodiment, a client computer 401 can access a number of destination sites 460 and 470 by means of Internet 499. In some embodiments, client computer 401 accesses filtering server 490, by means of Internet 499, in order to determine whether to permit or deny a request.

In the depicted embodiment, client computer 401 is shown as being divided into several abstraction layers, e.g., user space 410, kernel space 420, and hardware 430. In networking program, such as browser 411, executes within user space 410. A helper application, such as browser helper object 413, is installed on client computer 401, and interfaces with browser 411. When browser 411 issues a request, e.g., for web page, the request passes through interface 415 to kernel space 420. The request passes through filtering service 414 via filtering service API 417, before it reaches networking stack 423.

Filtering service 414, in this embodiment, examines the request, and compares it to an applicable local policy for networking traffic. During this comparison, filtering service 414 may access filtering server 490 to retrieve a request rating corresponding to the request; filtering service 414 may also access a local cache of request ratings, which may have been previously received from filtering server 490.

Filtering service 414 determines whether to allow or deny the request, and instructs BHO 413 either to pass the request, or to perform an appropriate denial operation, e.g., redirecting browser 411 to a page indicating that the request is prohibited under local policies. If the request is allowed, it is processed by an appropriate device driver 425, e.g., network driver 429, and passed to the appropriate hardware in hardware layer 430, e.g., network interface card (NIC) 431.

For allowable requests, filtering service 414 instructs browser helper object 413 to pass the request, as well as similar requests, e.g., automated requests generated by browser 411 that are related to the allowable user-initiated request. In some embodiments, filtering service 414 communicates with browser helper object 413 via an API, such as filtering service API 417. In some embodiments, filtering service 414 passes a special identifier to browser helper object 413. Browser helper object 413 can then include this special identifier in such automated requests. When network filter driver 421 receives a request including a valid a special identifier, filtering service 414 can instruct network filter driver 421 to remove the special identifier and pass the request, without the need to authenticate the request.

In different embodiments, different methods are used for generating this special identifier. For example, in one embodiment, a new identifier is generated for each user-initiated request. In other embodiments, an identifier may be generated when a user logs into the computer. Moreover, different information may be used in generating the identifier. For example, in one embodiment, a number generated when the user logged in, a timestamp, and a portion of the content of the user-initiated request are used to generate the special identifier, e.g., by applying a hash function. Including the timestamp helps prevent fraudulent use of the special identifier, e.g., where a previously issued special identifier is attached to a new request; similarly, use of the timestamp allows the special identifier to "expire," which is particularly useful when dealing with content which is rapidly updated and should be frequently verified, e.g., such as many web pages.

Method of Selectively Filtering Network Traffic Requests

Figure 5:
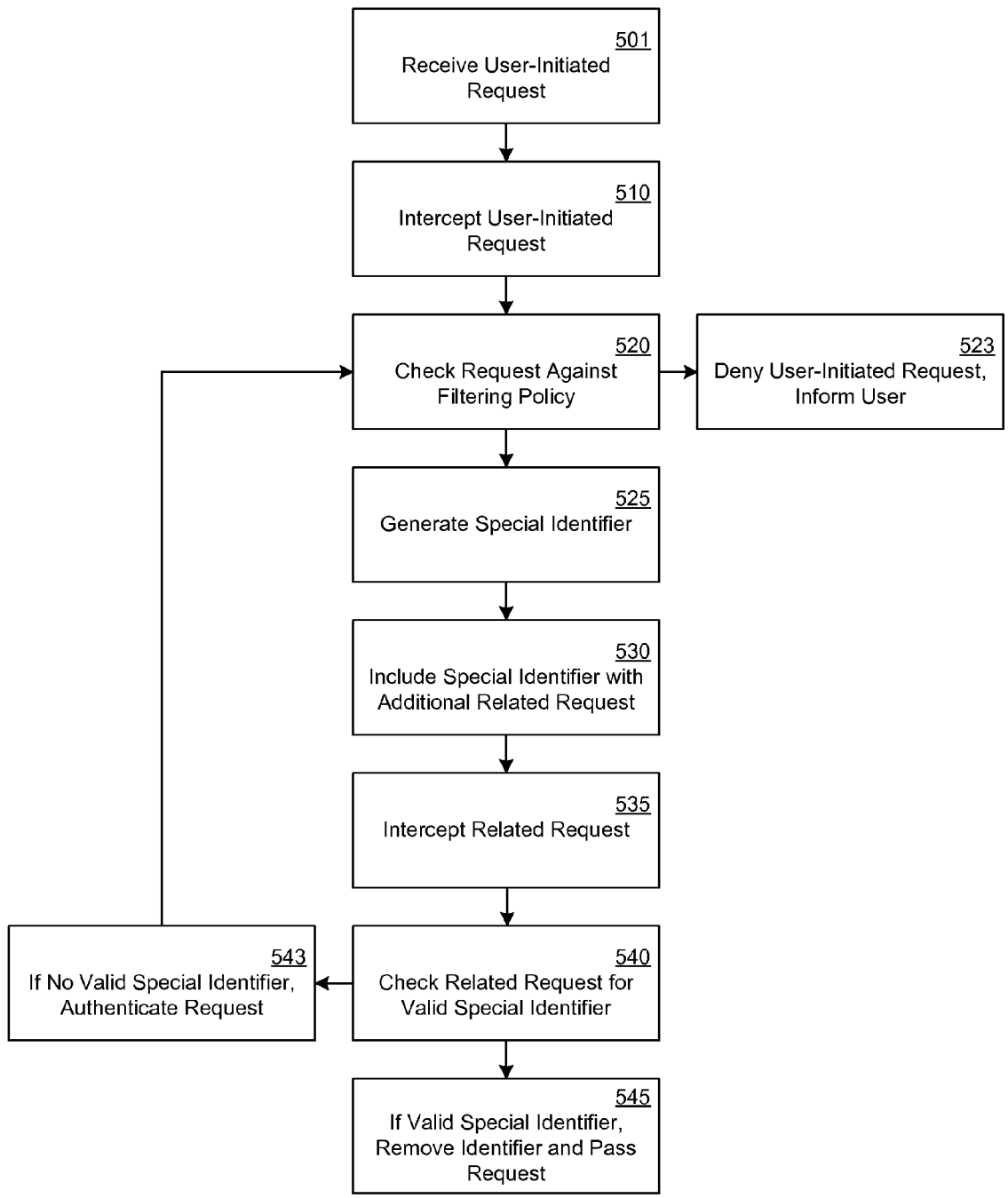
FIG. 5 depicts a flowchart of a method of selectively filtering network traffic requests, in accordance with one embodiment.

With reference now to FIG. 5, a flowchart 500 of a method of selectively filtering network traffic requests is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference now to step 501, a user-initiated request is received. In different embodiments, user-initiated requests may take different forms. For example, in an embodiment involving Web traffic filtering, a user may type a URL into the address bar of a Web browser, or may click on a hyperlink displayed on a web page.

With reference now to step 510, the user-initiated request is intercepted. As discussed previously, this step can be performed in different ways in different embodiments. In an embodiment involving Web traffic filtering, for example, a browser helper object uses functionality available through a Web browser to detect user-initiated requests, and distinguish such requests from automated requests. In some embodiments, such a helper application can communicate directly with a filtering service, e.g., running on the same computer. In other embodiments, the request is intercepted by another agent, e.g., a network filter driver between the requesting program and the operating system's networking stack.

For example, with reference to FIG. 4, a user types a URL for a web site hosted on destination site 460 into browser 411. Browser helper object 413 notes that this request is a user-initiated request, and calls into filtering service 414 via API 417.

With reference now to step 520, a filtering service checks the user-initiated request against a filtering policy. As discussed previously, a local filtering policy is used to determine whether a request should be allowed or blocked. In evaluating the user-initiated request, some embodiments involve the filtering service requesting data from a remote filtering server, such as a rating corresponding to the user-initiated request, e.g., a rating generated by the remote filtering server as to a particular requested web page. Comparing this rating against the applicable filtering policy may determine whether the request is allowable. In some embodiments, the filtering service notifies the helper application and/or the network filter driver as to the outcome of the comparison. Additionally, in some embodiments, the user-initiated request is logged, e.g., a user-initiated request for a web site is recorded in a log file.

With reference now to step 523, if the request is determined to be not allowable, the user is so informed. In some embodiments, the helper application can direct the user's networking program to display information indicating that the request is not allowable under the current policy, e.g., a browser helper object can redirect to a Web browser to a page indicating that the request is not allowable. In other embodiments, the network filter driver may be utilized to comp which this step, e.g., by modifying an outgoing request to direct to such an informative web page.

With reference now to step 525, if the request is allowable, the filtering service generates a special identifier. As previously discussed, in different embodiments, the special identifier may be generated in different ways. Moreover, in different embodiments, the special identifier may be implemented in different forms, e.g., a header included on outgoing requests.

Continuing the preceding example, filtering service 414 examines the user-initiated request, and compares it with the applicable local policy on Web traffic. The service 414 may also access filtering server 490, to obtain a rating corresponding to the requested web site; alternatively, filtering service 414 may have previously cached a rating corresponding to the requested web site. If local policy would deny this request, filtering service 414 instructs network filter driver 421 modify or delete the user-initiated request, in order to redirect browser 411 to a web page indicating that the request could not be authorized.

If the applicable local policy allows the request, filtering service 414 instructs BHO 413 to pass the request. Filtering service 414 generates a networking identifier, using a hash of the request, the current time, and a number generated when the user logged onto the computer. This networking identifier is then passed to browser helper object 413 via filtering service API 417.

With reference now to step 530, the special identifier is included with any additional request related to the initial user-initiated request. In some embodiments, automated requests corresponding to the single user-initiated request do not require further authentication; additionally, in several such embodiments, these automated requests are not logged. The helper application includes the special identifier in such automated requests, e.g., by placing it in the header of an outgoing request. Additionally, in some embodiments, further user-initiated requests for the scene content may not require additional authentication. For example, in some embodiments, after a user-initiated request for web site has been allowed, further user-initiated requests for that web site may also include the special identifier. In one such embodiment, where the current time is used in generating the special identifier, the filtering service "expires" the special identifier after a set duration of time.

With reference now to step 535, the additional request is intercepted. In some embodiments, the network filter driver is configured to intercept all outgoing requests, and clear them with the filtering service.

With reference now to step 540, the additional request is checked for the presence of a valid special identifier.

With reference now to step 543, if the additional request does not include the special identifier, the request should be authenticated. The filtering service begins to authenticate the request, as per step 520.

With reference now to step 545, if the additional request includes the special identifier, the request is exempted from authentication. In some embodiments, a filtering service instructs the network filter driver to remove the special identifier, and allow the request to be transmitted.

Continuing the preceding example, as the requested web site loads, automated requests for images stored on destination site 470 are generated by browser 411. Browser helper object 413 includes the networking identifier in the header for all automated requests related to the user-initiated request for the web page on destination site 460. These automated requests are intercepted by network filter driver 421, which notifies filtering service 414. Filtering service 414 compares the networking identifier included in the header of the requests with a stored copy of the networking identifier. If the networking identifier is valid and unexpired, filtering service 414 instructs network filter driver 421 to remove the networking identifier from the requests, and pass them to network stack 423. If a request is received which lacks the networking identifier, or if the networking identifier is no longer valid, filtering service 414 attempts to validate the request, as described previously.

Embodiments of the present invention are thus described. While the present invention has been described in particular embodiments, it should be appreciated that the present invention should not be construed as limited by such embodiments, but rather construed according to the following claims.

What is claimed is:

1. A method of selectively filtering network traffic, comprising:
   receiving, on a client computing device, an initial request for network-accessible content generated by a networking program on said client computing device;
   determining whether said initial request is allowable by a filtering service on said client computing device that is configured to monitor said networking program;
   generating, by said filtering service, a special identifier corresponding to said initial request if said initial request is allowable with reference to a filtering policy;
   passing, by said filtering service, identifier to an application or object installed on said client computing device that is configured to intercept requests for network-accessible content generated by said networking program and to include said special identifier corresponding to said initial request in subsequent requests for network-accessible content intercepted from said networking program which are related to said initial request for network-accessible content;
   receiving, at said filtering service, a subsequent request for network-accessible content generated by said networking program; and
   allowing, by said filtering service, said subsequent request without reference to said filtering policy if said subsequent request includes said special identifier corresponding to said initial request.

2. The method of claim 1, wherein said filtering policy comprises a local policy on Web traffic.

3. The method of claim 1, wherein said filtering service references a rating corresponding to content related to said initial request.

4. The method of claim 1, wherein said special identifier corresponding to said initial request is generated from a timestamp, an identifier corresponding to a user, and a portion of the initial request.

5. The method of claim 1, wherein said initial request is a user-initiated request and said subsequent request is an automated request related to said user-initiated request.

6. The method of claim 1, further comprising:
   determining if said special identifier included in said subsequent request is valid.

7. The method of claim 1, further comprising:
   logging said initial request; and
   allowing said subsequent request without logging said subsequent request.

8. A system for selectively filtering network traffic, comprising:
   a helper application on a client computing device, coupled to a networking program on said client computing device, for identifying a user-initiated request for network-accessible content generated by said networking program; and
   a filtering service on said client computing device, coupled to said helper application, for determining if said user-initiated request is allowable, wherein:
   said filtering service is configured to monitor said networking program on said client computing device, generate a special identifier corresponding to said user-initiated request if said user-initiated request is allowable with reference to a filtering policy, and pass said special identifier to said helper application;
   said helper application is configured to intercept requests for network-accessible content generated by said networking program and include said special identifier corresponding to said user-initiated request in subsequent requests for network accessible content intercepted from said networking program which are related to said user-initiated request; and
   said filtering service is configured to allow said subsequent request without reference to said filtering policy if said subsequent request includes said special identifier corresponding to said user-initiated request and instruct a network filter driver to remove said special identifier corresponding to said user-initiated request from said subsequent request.

9. The system of claim 8, wherein said filtering policy is a local policy on Web traffic.

10. The system of claim 8, wherein said filtering service references a rating corresponding to content related to said user-initiated request.

11. The system of claim 10, wherein said rating is obtained from a remote filtering server.

12. The system of claim 10, wherein said rating is obtained from a local cache maintained by said filtering service.

13. The system of claim 8, wherein said filtering service is configured to reject said special identifier after a predetermined length of time.

14. A computer-readable storage medium storing computer-executable instructions that, when executed, cause a client computing device to perform steps comprising:
- receiving a user-initiated request for network-accessible content generated by a networking program on said client computing device;
- determining whether said user-initiated request is allowable;
- generating an identifier corresponding to said user-initiated request if said user-initiated request is allowable with reference to a filtering policy;
- passing said identifier to an application or object installed on said client computing device that is configured to intercept requests for network-accessible content generated by said networking program and to include said identifier corresponding to said user-initiated request in subsequent request requests for network-accessible content intercepted from said networking program which are related to said user-initiated request;
- receiving a subsequent request for network-accessible content generated by said networking program;
- determining that said subsequent request includes said identifier corresponding to said user-initiated request;
- determining that said identifier corresponding to said user-initiated request is valid; and
- allowing said subsequent request, without reference to said filtering policy.

15. The computer-readable storage medium of claim 14, wherein said steps comprise:
- comparing a rating corresponding to said network-accessible content with said filtering policy.

16. The computer-readable storage medium of claim 14, wherein said identifier corresponding to said user-initiated request is generated by hashing a timestamp, a generated value corresponding to a user, and a portion of said user-initiated request.

17. The computer-readable storage medium of claim 14, wherein:
- said user-initiated request is initiated in response to a user entering a uniform resource locator or clicking a hyperlink of a requested web site, and
- said subsequent request comprises an automated request for an image on said requested web site that is generated by said networking program in response to said user-initiated request.

18. The computer-readable storage medium of claim 14, wherein said user-initiated request comprises a hypertext transfer protocol (HTTP) request.

19. The computer-readable storage medium of claim 14, wherein said user-initiated request comprises a request for access to digital multimedia content.

20. The computer-readable storage medium of claim 14, wherein said user-initiated request comprises a request for access to an online game.

* * * * *

UNITED STATES PATENT AND TRADEMARK OFFICE
CERTIFICATE OF CORRECTION

PATENT NO.        : 8,208,375 B2
APPLICATION NO.   : 12/050162
DATED             : June 26, 2012
INVENTOR(S)       : Bharadwaj et al.

It is certified that error appears in the above-identified patent and that said Letters Patent is hereby corrected as shown below:

In column 9, line 56, in Claim 1, after "service," insert -- said special --.

In column 11, line 27, in Claim 14, delete "request," and insert -- request --, therefor.

Signed and Sealed this
Eighteenth Day of December, 2012

David J. Kappos
*Director of the United States Patent and Trademark Office*